United States Patent
Larsson et al.

(10) Patent No.: US 8,127,749 B2
(45) Date of Patent: Mar. 6, 2012

(54) CRANK CASE VENTILATION

(75) Inventors: Erik Larsson, Hakenäset (SE); Daniel Forslöw, Billdal (SE)

(73) Assignee: Volvo Lastvagvar AB, Göteborg (SE)

( * ) Notice: Subject to any disclaimer, the term of this patent is extended or adjusted under 35 U.S.C. 154(b) by 0 days.

(21) Appl. No.: 12/919,491

(22) PCT Filed: Feb. 26, 2008

(86) PCT No.: PCT/SE2008/000161
§ 371 (c)(1), (2), (4) Date: Sep. 17, 2010

(87) PCT Pub. No.: WO2009/108085
PCT Pub. Date: Sep. 3, 2009

(65) Prior Publication Data
US 2010/0326409 A1    Dec. 30, 2010

(51) Int. Cl.
*F02B 75/18*    (2006.01)
(52) U.S. Cl. ..................... 123/572; 123/559.1
(58) Field of Classification Search .......... 123/572–574, 123/41.86, 559.1–559.3
See application file for complete search history.

(56) References Cited

U.S. PATENT DOCUMENTS

| | | | |
|---|---|---|---|
| 1,644,719 A * | 10/1927 | Fliedner | 123/41.67 |
| 4,768,493 A | 9/1988 | Ohtaka et al. | |
| 4,901,703 A * | 2/1990 | Humphries | 123/572 |
| 5,970,962 A | 10/1999 | Nelson et al. | |
| 6,390,080 B1 | 5/2002 | Dowding et al. | |
| 6,412,479 B1 | 7/2002 | Canfield et al. | |
| 6,772,744 B2 | 8/2004 | Nanno et al. | |
| 7,316,226 B2 * | 1/2008 | Callahan | 123/572 |
| 2003/0140909 A1 * | 7/2003 | Criddle et al. | 123/572 |

FOREIGN PATENT DOCUMENTS

EP    1045117 A1    10/2000

OTHER PUBLICATIONS

International Search Report for corresponding International Application PCT/SE2008/000161.

* cited by examiner

*Primary Examiner* — Marguerite McMahon
(74) *Attorney, Agent, or Firm* — WRB-IP LLP

(57) ABSTRACT

A crank case ventilation system for ventilation of blow by gases from an internal combustion engine includes a crank case ventilation pipe connectable with a first end to the internal combustion engine for receiving blow by gases from the internal combustion engine and with a second end to an air inlet pipe provided upstream of a turbo and/or a super charger, where the second end of the crank case ventilation pipe is provided for delivering blow by gases to the air inlet. At least a part of at least one heat pipe is provided inside the crank case ventilation pipe, where the at least one heat pipe is provided for transporting compressed air to an inlet downstream the turbo and/or the super charger.

12 Claims, 1 Drawing Sheet

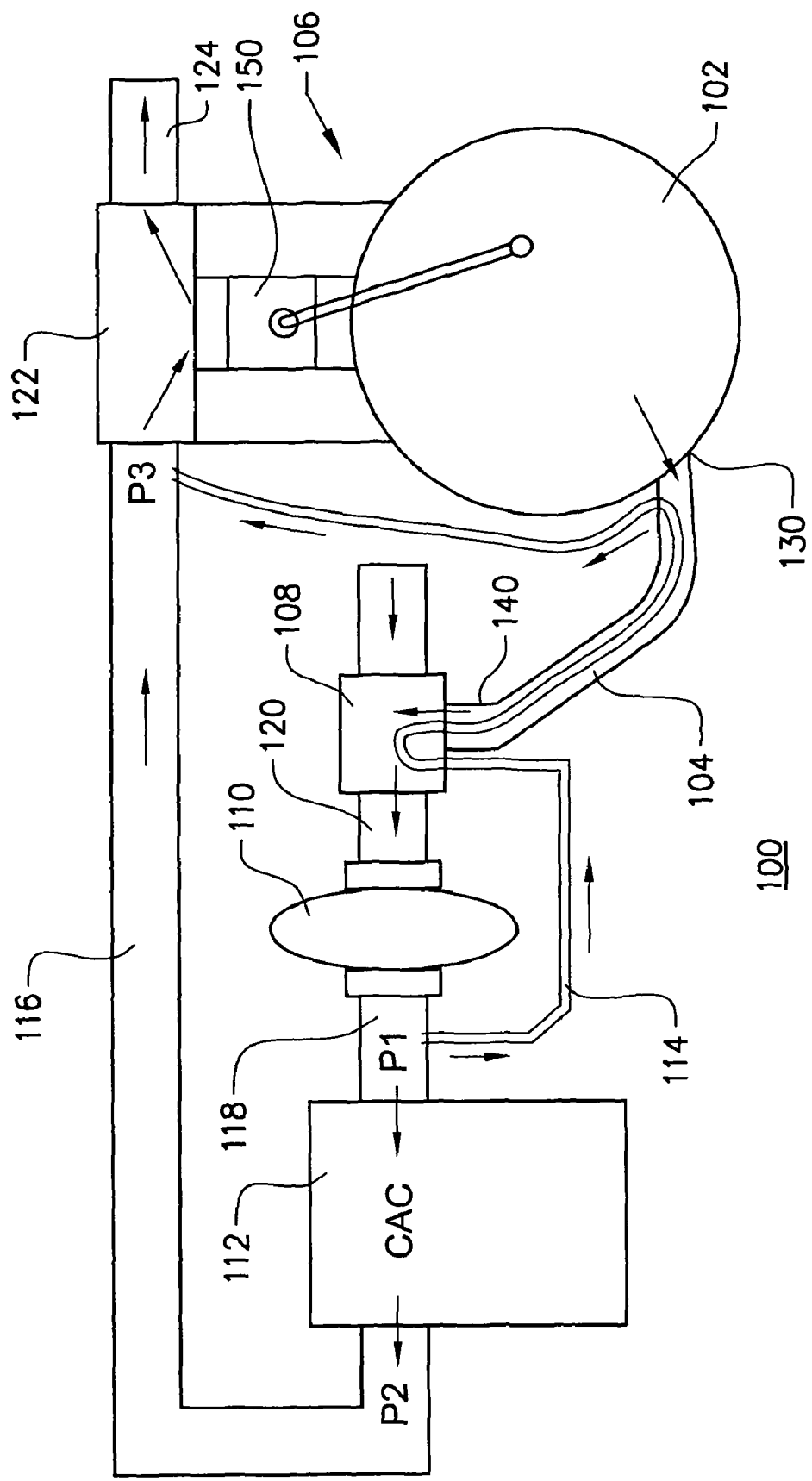

CRANK CASE VENTILATION

BACKGROUND AND SUMMARY

The present invention relates to a heated crank case ventilation system and a method for ventilating blow by gases from a crank case of an internal combustion engine.

Crankcase blow-by gases are produced when combustion gases are blown past the piston rings into the crankcase. The blow-by, which inter alia includes air, fuel, vapour, and other toxic combustion by products, increases the pressure within the engine block. These blow-by gases will interfere with engine performance if allowed to remain in the crankcase. If the blow-by gases are not relieved from the crank case it will force the oil to escape from the engine via the dip stick and/or the gaskets and the engine will thus lose lubrication.

Blow-by gases contains a certain amount of water/moisture, which can freeze to ice if the vehicle is in a freezing environment and this may stop blow by gases to escape from the crank case via a crank case ventilation system. The forming of ice can occur during standstill of the vehicle when the engine is turned of or in cold environments ice may form even when the engine is operating.

Various solutions have been proposed in the prior art to prevent freezing in the crank case ventilation systems. In U.S. Pat. No. 4,768,493 a system is disclosed in which a water jacket circulates warmed engine coolant around a positive crank case ventilation (PCV) valve. However, this system and other systems employing engine coolant have several disadvantages. The systems are too slow to work during a cold start and fail to provide heat quickly enough to prevent freezing. In addition, these systems remove capacity and related efficiency from the engine cooling system, which is generally carefully designed for the engine. Finally, these systems are relatively expensive and complex and add unnecessary weight to the vehicle.

In U.S. Pat. No. 5,970,962 electric heaters are disclosed for heating the PCV system. Electric heaters, however, drain power from the electrical system of the vehicle. The heaters are also relatively expensive and labour intensive with respect to manufacture and installation.

In addition, the above identified solutions and other solutions are not completely effective in overcoming the effects of wind chill which vary widely and which is responsive to factors such as ambient temperature, the moisture content of the environment, and the velocity of the air surrounding the crankcase ventilation system.

It is desirable to provide more effective thermal management device for a crank case ventilation system that will minimize or eliminate one or more of the above mentioned deficiencies.

According to a first aspect of the invention it is provided a crank case ventilation system (100) for ventilation of blow by gases from an internal combustion engine (106). Said system (100) comprising a crank case ventilation pipe (104) connectable with a first end (130) to the internal combustion engine (106) for receiving blow by gases from said internal combustion engine. A second end (140) of said crank case ventilation pipe (104) is provide to an air inlet pipe provided upstream of a turbo (110) and/or a super charger. Said second end of said crank case ventilation pipe (104) is provided for delivering blow by gases to said air inlet. At least a part of at least one heat pipe (114) is provided inside said crank case ventilation pipe (104). Said at least one heat pipe (114) is provided for transporting compressed air to an inlet downstream said turbo (110) and/or super charger.

An advantage with the present invention is that heat generated when making compressed air is used for heating the crank case ventilation system.

In another example embodiment said compressed air in said heat pipe is provided from said turbo or said super charger. In still another example embodiment said compressed air is generated in a separate air compressor, electrically or mechanically driven, for creating air pressure for the brakes etc in a vehicle. In still another example embodiment said compressed air is generated by a belt driven compressor or supercharger for compressing inlet air to the internal combustion engine.

The heat pipe may in another example embodiment be connected with a first end between said turbo and a charge air cooler for receiving compressed air with a pressure P1 and with a second end to a position between said turbo and said charge air cooler (112) where said pressure is lower than P1.

The heat pipe is connected with a first end between said turbo or said super charger and a charge air cooler for receiving compressed air and with a second end to a position between a charge air cooler (112) and a cylinder head.

The heat pipe is connected with a first end between said turbo or super charger and a charge air cooler for receiving compressed air and with a second end to said charge air cooler (112).

The second end of said crank case ventilation pipe is connected to an air filter (108).

According to another aspect of the present invention it is provided a method for ventilating blow by gases from a crank case of an internal combustion engine, comprising the actions of: providing a crank case ventilation pipe for receiving blow by gases from said crank case of said internal combustion engine, transporting said blow by gases from said crank case to an inlet of said internal combustion engine, where said inlet is provided upstream of a turbo and/or a super charger. Said method further comprising the action of providing at least a part of one heat pipe inside said crank case ventilation pipe, where said at least one heat pipe is provided for transporting compressed air to an inlet downstream of said turbo and/or said super charger.

BRIEF DESCRIPTION OF THE DRAWINGS

With reference to the appended drawings below follows a more detailed description of embodiments of the invention cited as examples.

In the drawings:

FIG. 1 shows a schematic illustration of a first example embodiment of a crank case ventilation system according to the present invention.

In the drawings, equal or similar elements are referred to by equal reference numerals. The drawings are merely schematic representations, not intended to portray specific parameters of the invention. Moreover, the drawings are intended to depict only typical embodiments of the invention and therefore should not be considered as limiting the scope of the invention.

DETAILED DESCRIPTION

In FIG. 1 a first schematic example embodiment of an a crank case ventilation system 100 for ventilation of blow by gases from an internal combustion engine 106, said system 100 comprising a crank case ventilation pipe 104 connectable with a first end 130 to the internal combustion engine 106 for receiving blow by gases from said internal combustion engine and with a second end 140 to an air inlet pipe provided upstream of a turbo 110, an air filter 108, a charge air cooler (CAC) 112 and a heat pipe 114.

Blow by gases are created when gaseous mixtures of unburned fuel, air and other constituents products of combustion leak past piston rings provided on the piston(s) 150 disposed within the internal combustion engine's cylinder(s).

Air is provided to the internal combustion engine via the air filter 108 which is provided upstream of the turbo 110. Said air filter 108 is connectable to the turbo 110 via a pipe 120. Air is compressed in said turbo 110 and delivered to a cylinder head 122 of the internal combustion engine via a charge air cooler 112. Said charge air cooler is connectable to the cylinder head 122 via a pipe 116 and said charge air cooler is connectable to the turbo via pipe 118. Exhaust gases from the internal combustion engine is transported through an exhaust gas manifold 124 and further to the exhaust system (not shown).

The turbo unit 110 may be a one stage unit or a two stage unit. The heat pipe 114 may in a first example embodiment be provided with a first end between the turbo and the charge air cooler 112 and with a second end between the charge air cooler 112 and the cylinder head 122. The heat pipe 114 may in a second example embodiment be provided with a first end between the turbo and the charge air cooler 112 where the pressure is P1 and with a second end between the charge air cooler 112 and the turbo 110 where the pressure is below P1. The pressure into the heat pipe is higher then the pressure delivered from the heat pipe because of the pressure drop through said heat pipe. Therefore, the second end of the heat pipe which is used for returning the compressed air into a intake air system downstream said turbo must be made at a position where the pressure is lower than the pressure delivered into the heat pipe 114, in this case P1. If the pressure at the second end would be higher than or substantially equal to P1 compressed air may not be able to be transported in the heat pipe and therefore said heat pipe will not generate the requisite heat. In FIG. 1 the pressure between the turbo 110 and the charge air cooler 112 is denoted with P1 which is higher than the pressure just after the charge air cooler which is denoted with P2 which in turn is higher than the pressure just before the cylinder head which is denoted with P3. In still another example embodiment said first end of said heat pipe may be arranged between said turbo 110 and said charge air cooler 112 and said second end of said heat pipe may be arranged at any position on said charge air cooler.

The material in the heat pipe could be metal or any heat resistant plastic material. Said heat pipe may be provided with cooling fins or other cooling arrangements for enhancing the heating of the blow by gases in the crank case ventilation pipe 104. Said cooling fins may only be provided in the vicinity of the first end 130 of said crank case ventilation pipe 104 or alternatively only at the positions of said heat pipe 114 being provided inside said crank case ventilation pipe 104.

The material of the crank case ventilation pipe may be steel or any heat resistant plastic material. The crank case ventilation pipe 114 may also be heat isolated. This heat isolation may be performed by a double layer structure or the crank case ventilation pipe, i.e., a larger diameter pipe surrounding a smaller diameter pipe with either air or any other isolating material in between. Another example of heat isolation may be to wrap heat isolating material on the outside of the crank case ventilation pipe.

In the illustrated example embodiment in FIG. 1 said second end of the crank case ventilation pipe 104 is connected to the air filter. It is possible in alternative embodiments to connect said second end of said crank case ventilation pipe 104 to any position of the air inlet upstream said turbo 110 or a super charger (not shown). Said super charger may be belt driven, mechanically driven directly from the camshaft or crank shaft or electrically driven. It is also possible to use a combination of a supercharger and a turbo, in that case said second end of the crank case ventilation pipe should be arranged upstream of both said turbo and said supercharger.

By returning the compressed air from the heat pipe downstream the turbo 110 there will not be as much boost pressure leakage as compared to returning the compressed air upstream said turbo. Returning the compressed air from the heat pipe upstream said turbo 110 will substantially be equal to spilling said compressed air in said heat pipe 114 to the ambient atmosphere resulting in an efficiency drop of the internal combustion engine which is much higher compared to as teaching by the present invention to return the compressed air from the heat pipe downstream said turbo 110.

In FIG. 1 it is illustrated that said heat pipe is not only provided inside said crank case ventilation pipe 114 but also inside said air filter 108. This may be useful for heating up air filter at the position where the crank case ventilation pipe is arranged at said air filter. Moisture in the blow by gases may start to freeze and build up an ice layer on the air filter in certain circumstances if not heated in a sufficient manner.

The first end of the crank case ventilation pipe 114 is illustrated to be arranged at the crank case or oil pan in FIG. 1. It may of course be equivalent arrange said crank case ventilation pipe 114 at the cylinder block and/or the cylinder head and/or a cylinder head cover if sufficient channels for blow by gases are provide inside the crank case and/or the cylinder block and/or the cylinder head.

The type of internal combustion engine may be a diesel engine, a gasoline engine or a flexi-fuel engine with one or more cylinders in a row, V-form or boxer form.

In the illustrated embodiment in FIG. 1 a portion of only one heat pipe 114 is provided inside said crank case ventilation pipe 104. In an alternative embodiment two or more heat pipes may be used. In such a case compressed air may be delivered to a first heat pipe from a super charger, to a second heat pipe from a turbo and to a third heat pipe from an electrically driven compressor for generating compressed air to the braking system. An advantage of having more than one pipe coming from alternative compressed air generating systems is that the time for heating up the crank case ventilation pipe may be minimized.

It is to be understood that the present invention is not limited to the embodiments described above and illustrated in the drawings; rather, the skilled person will recognize that many changes and modifications may be made within the scope of the appended claims.

The invention claimed is:

1. A crank case ventilation system for ventilation of blow by gases from an internal combustion engine, the system comprising a crank case ventilation pipe connectable with a first end to the internal combustion engine for receiving blow by gases from the internal combustion engine and with a second end to an air inlet pipe provided upstream of a turbo and/or a super charger, where the second end of the crank case ventilation pipe is provided for delivering blow by gases to the air inlet, wherein at least a part of at least one heat pipe is provided inside the crank case ventilation pipe, where the at least one heat pipe is provided for transporting compressed air to an inlet downstream the turbo and/or the super charger.

2. The crank case ventilation system according to claim 1, wherein the compressed air in the at least one heat pipe is provided from one or more of the following sources: the turbo, the super charger and/or an air compressor for generating compressed air to a vehicle braking system.

3. The crank case ventilation system according to claim 1, wherein the heat pipe is connected with a first end between the turbo or super charger and a charge air cooler for receiving compressed air with a pressure P1 and with a second end to a position between the turbo or super charger and the charge air cooler where the pressure is lower than P1.

4. The crank case ventilation system according to claim 1, wherein the heat pipe is connected with a first end between the turbo or super charger and a charge air cooler for receiving compressed air and with a second end to a position between a charge air cooler and a cylinder head.

5. The crank case ventilation system according to claim 1, wherein the heat pipe is connected with a first end between the turbo or super charger and a charge air cooler for receiving compressed air and with a second end to the charge air cooler.

6. The crank case ventilation system according to claim 1, wherein the second end of the crank case ventilation pipe is connected to an air filter.

7. A method for ventilating blow by gases from a crank case of an internal combustion engine, comprising:
providing a crank case ventilation pipe for receiving blow by gases from the crank case of the internal combustion engine,
transporting the blow by gases from the crank case to an inlet of the internal combustion engine, where the inlet is provided upstream of a turbo and/or a super charger,
providing at least a part of one heat pipe inside the crank case ventilation pipe, where the at least one heat pipe is provided for transporting compressed air to an inlet downstream of the turbo and/or the super charger.

8. The method according to claim 7, further comprising:
providing the compressed air in the at least one heat pipe from one or more of the following sources: the turbo, the super charger and/or an air compressor for generating compressed air to a vehicle braking system.

9. The method according to claim 7, further comprising:
connecting the heat pipe with a first end between the turbo or super charger and a charge air cooler for receiving compressed air with a pressure P1,
connecting the heat pipe with a second end between the turbo or a super charger and the charge air cooler where the pressure is lower than P1.

10. The method according to claim 7, further comprising:
connecting the heat pipe with a first end between the turbo or super charger and a charge air cooler for receiving compressed air,
connecting the heat pipe with a second end between the charge air cooler and a cylinder head.

11. The method according to claim 7, further comprising:
connecting the heat pipe with a first end between the turbo or super charger and a charge air cooler for receiving compressed air,
connecting the heat pipe with a second end to the charge air cooler.

12. The method according to claim 7, further comprising providing the second end of the crank case ventilation pipe to an air filter.

* * * * *